United States Patent [19]
Devine et al.

[11] 4,133,116
[45] Jan. 9, 1979

[54] GROUND SLOPE ANALYZER

[76] Inventors: Billy B. Devine, 1914 General Pershing St., Laurel, Miss. 39440; Otis E. Robertson, Augusta Rd., Ellisville, Miss. 39437

[21] Appl. No.: 817,841

[22] Filed: Jul. 21, 1977

[51] Int. Cl.$^2$ .............................................. G01C 9/28
[52] U.S. Cl. ....................................... 33/386; 33/387
[58] Field of Search .......... 33/343, 388, 348, 374–377, 33/385–387

[56] References Cited
U.S. PATENT DOCUMENTS

| | | | |
|---|---|---|---|
| 824,985 | 7/1906 | Greene | 33/388 |
| 842,999 | 2/1907 | Calhoon | 33/388 X |
| 1,203,521 | 10/1916 | Ford | 33/388 X |
| 1,450,296 | 4/1923 | Lucas | 33/388 |
| 1,789,344 | 1/1931 | Simon | 33/388 X |
| 2,854,762 | 10/1958 | Wright | 33/348 |
| 3,009,250 | 11/1961 | Schock | 33/388 |

*Primary Examiner*—Charles E. Phillips
*Attorney, Agent, or Firm*—Lowe, King, Price & Becker

[57] ABSTRACT

A slope analyzer is provided for attachment to an earth-working vehicle to provide the operator with a direct readout when a selected slope has been attained during the grading operation. An indicator arm is pivotally mounted on a base and movable to a selected slope ratio indicia. Slopes wherein the uphill side of the vehicle is either on the left or the right may be accurately monitored. A curved spring strip forms a preferred retaining means for the arm and a spirit level provides the desired simple readout for the device.

5 Claims, 3 Drawing Figures

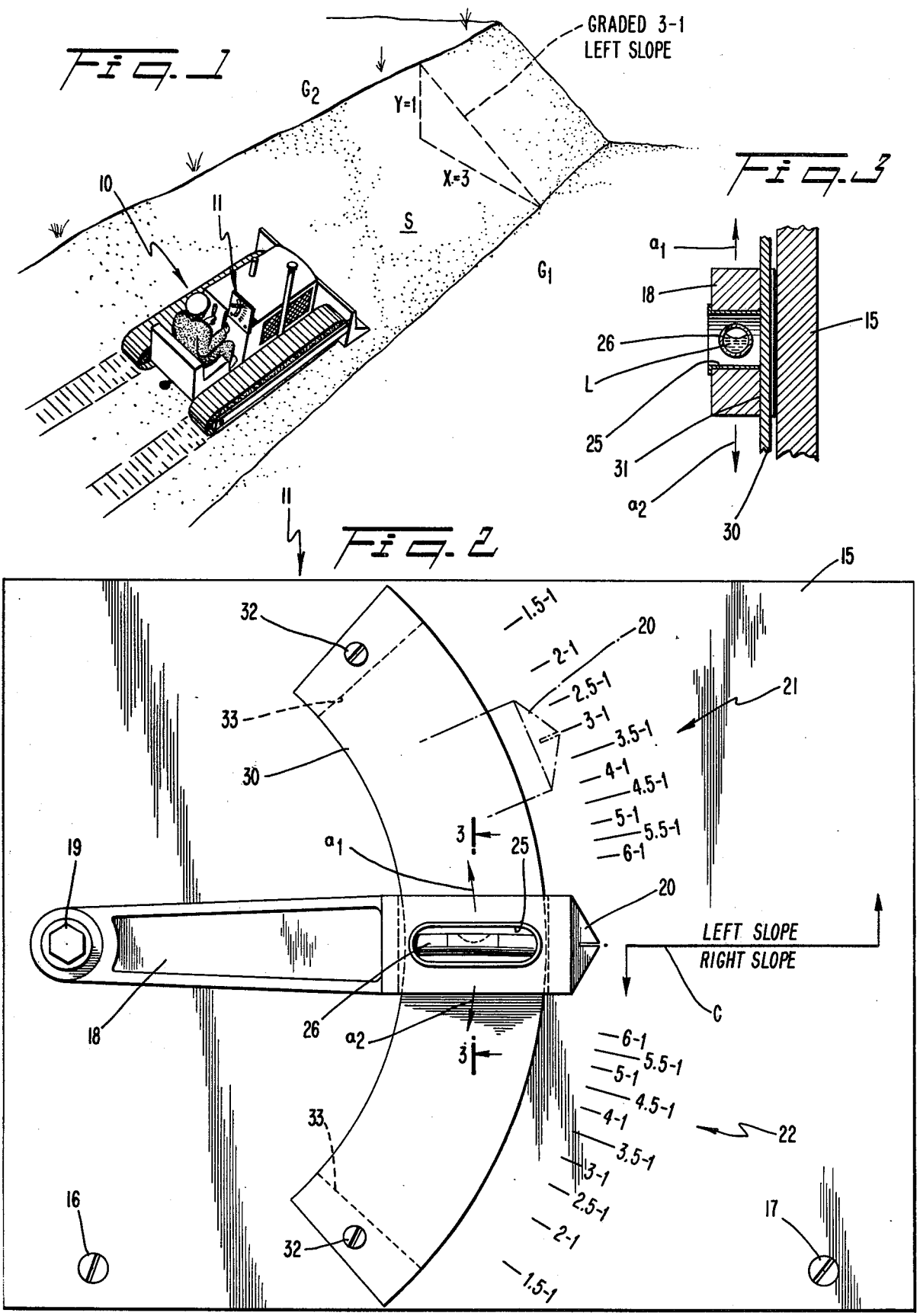

GROUND SLOPE ANALYZER

FIELD OF THE INVENTION

The present invention relates to earth-working, and more particularly, to a self-contained instrument directly mountable on an earth-working vehicle to indicate to the operator when a desired graded slope ratio has been attained.

BACKGROUND OF THE INVENTION

In the earth-working field, the slope of the land is normally set forth in terms of a ratio of the horizontal distance compared to the vertical distance of the slope. Engineers for landscaping, road building, dam building and the like, indicate to the operator of the grading vehicle the particular finished grade in terms of this slope ratio.

Heretofore, in order to obtain a precise slope ratio, the contractor has had to employ on the site engineers to lay out the grade with a surveyor's level. Indicating markers would have to be placed along the ground indicating the amount of cut and fill necessary at particular points to obtain the finished grade. Most of the time, one or more checks of the grade with the surveyor's level is required in order to obtain the precise slope that is required in such precision engineering projects as road building and dam building. This is a time-consuming and expensive proposition for the grading contractor.

Because of the expense, many contractors are known to instruct their operators to simply "eyeball" the desired slope. A skilled operator can come close to the slope desired, but cannot on a regular basis come within the accuracy that is imposed on most construction projects. When the inaccuracy is noted, the contractor must spend extra time to correct the error in judgment, adding to the cost of the project. It is also known that the "eyeball" method is in itself time-consuming, since the vehicle operator must take extra time in his attempt to properly orient the grade to a true horizontal and/or vertical object or surface.

In any case, I have determined that it would be desirable to have a simple and rugged instrument carried directly on the grading vehicle in order to indicate to the operator with a high degree of accuracy the slope that is being cut.

OBJECTIVES OF THE INVENTION

Accordingly, the main object of the present invention is to provide such an instrument in order to improve the efficiency of a grading operation.

It is another object of the present invention to provide such an instrument or device that is easy to use and highly efficient in operation.

It is still another object of the present invention to provide a slope analyzer device utilizing a pivotal arm movable either up or down to indicate either left or right slope ratios.

It is still another object of the present invention to provide a slope analyzer device having a pivotal indicator arm that is easily adjusted and retained in the adjusted position even under the adverse vibrating conditions of the grading vehicle.

BRIEF DESCRIPTION OF THE INVENTION

A slope analyzing device of the present invention comprises a base to be mounted directly on the grading vehicle, such as a bulldozer or road grader, an indicator arm pivotally mounted on the base and an indicia positioned along the free end of the arm to select the slope required.

The indicia are provided in terms of horizontal to vertical ratio, that is, X-Y axis comparison. This is in accordance with engineering practice to indicate the slope of a graded embankment in the simple X-Y ratio.

The arm is securely retained in the selected position by a curved retaining plate that frictionally engages the underneath side of the arm. The plate is provided with an outward spring bias in order to provide secure friction and avoid movement from vibration of the vehicle, but at the same time allow quick and easy adjustment by the operator, who simply grasps the arm and moves it as desired.

The level on the pivotal arm is desirably simply a visual spirit level. Since the device is mounted adjacent the other gauges of the vehicle, it is easily read by the operator and can be easily observed by occasional visual glances. The simple design and ruggedness of the device makes it particularly desirable for the hostile construction environment in which it is being put to use.

BRIEF DESCRIPTION OF THE DRAWINGS

FIG. 1 is a perspective view of a grading vehicle moving along a slope, showing the use of the device of the present invention;

FIG. 2 is a front view of the slope analyzer device of the present invention; and FIG. 3 is a partial cross-sectional view taken along line 3—3 of FIG. 2 showing the relationship of the indicator arm, spring retaining strip and base member.

For a better understanding of the invention as well as other objects and features thereof, reference is made to the following detailed description of the invention to be used in conjunction with the accompanying drawings.

DETAILED DESCRIPTION OF THE INVENTION

With reference now to FIG. 1 of the drawings, there is shown a grading vehicle or bulldozer 10 working along a slope S that is being graded between two ground levels, $G_1$ and $G_2$. The vehicle 10 has mounted thereon along the firewall a slope analyzer 11 constructed in accordance with the principles of the present invention. The analyzer 11 is desirably positioned for easy viewing by the operator of the vehicle as the vehicle moves along the slope.

The analyzer 11 is positioned perpendicular to the longitudinal axis of the vehicle 10, so that the readout of the analyzer device is effective as the vehicle moves along the longitudinal axis of the slope S. It is understood that the device could be oriented at different angles, such as at 90° to that shown, whereby the analyzing function could be performed simply by moving the vehicle 10 up or down the slope S.

FIG. 2 has a disclosure of more details of the analyzer device 11. A base 15 is provided and preferably is of a simple rectangular form, as shown. The base 15 can be a plate of any suitable material, such as plywood, desirably marine quality plywood. The base 15 is made for easy mounting directly on the vehicle by provision of suitable screws 16, 17.

An indicator arm 18, which is desirably cast of a nonferrous metal or plastic is pivotally mounted on the base 15 by an adjustable fastener 19. The fastener 19, which may either be a lag screw or machine bolt with a nut on the opposite side of the base 15 (not shown), performs an important function of keeping the arm 18 steady in addition to providing the pivot point for the arm. The fastener 19 is desirably locked in position, by any conventional means, such as a lock washer, so that once adjusted, the arm can be easily repositioned by the operator, but at the same time will hold its position against the vibration of the vehicle at the desired slope indicia, as will be seen more clearly below.

The free end of the arm 18 has a pointer 20 that is designed to align with any one of several indicia 21, or indicia 22 above or below a center line, respectively, FIG. 2. The indicator arm 18 is movable in an arc either up or down (arrows $a_1$, $a_2$, respectively) by simply grasping the arm and pushing either up or down in an arc.

The indicia 21 above the centerline C are designed to provide a range of positioning of the arm 18 where an accurate slope can be graded in the position where the left side of the vehicle 10 is positioned on the uphill side. This would be in the orientation shown in FIG. 1. When the operator arrives at the far end of the slope S and turns around, the arm 18 may be reset in order to gauge the slope as the vehicle 11 moves back along the slope in the opposite direction (right side - uphill).

As shown in FIGS. 2 and 3, the arm 18 has a window 25 in which a spirit level tube 26 is mounted and protected. The tube has a bubble and indicator lines, as is conventional for the typical carpenter's level. As the arm 18 is moved from alignment with the centerline C, liquid L in the tube 26 moves, causing the bubble to move outside the indicator lines. Then, when the vehicle 10 is tilted in the opposite direction along the slope S, the bubble is brought back into the centered location between the lines, thereby establishing the desired slope ratio.

A particular example of a slope ratio of 3-1, that is, where the X axis is equal to 3 and the Y axis is equal to 1, is represented in FIG. 1. The dotted line position of the pointer 20 in FIG. 2 shows the proper orientation for the slope analyzing function when the vehicle 10 is moving along the 3-1 slope, as shown in FIG. 1.

Once the indicator arm 18 is positioned in the desired location, it is essential to assure that the arm does not move due to the vibration of the machine. The fastener 19 is designed to hold the arm 18 steady and firmly pressed against a curved spring strip, as shown in FIG. 2. The curved strip is thus frictionally engaged by the back face 31 of the arm 18 in the region of the pointer 20 or directly under the window 25. The strip 30 is mounted at its end by suitable screws 32.

In order to assure the springiness of the strip 30, the area between the two ends is spaced from the base 15, as shown in FIG. 3. This leaves a shoulder 33 at each end of the strip 30 (FIG. 2) for mounting.

The strip 30 may be fabricated of suitable nonferrous metal or plastic. A plastic of a bright contrasting color, such as red, is desirable since it provides a backdrop through the window 25 to provide better viewing of the liquid level bubble in the tube 26.

In summary, a simple and rugged device whereby the operator of the grading vehicle can easily determine the slope of a grade on a vehicle has been provided. The indicator arm 18 can be easily moved to a desired location having indicia 21, 22 representing the slope. The spirit level tube 26 provides an accurate indication of the slope and can be observed with a quick glance by the operator. The indicator arm 18 is easily positionable to new locations as required, but at the same time, the retaining strip 30 holds the arm 18 against unwanted movement.

The above-described preferred embodiments are illustrative of the invention which may be modified by those skilled in the art within the scope of the appended claims.

What is claimed is:

1. A device for analyzing the slope of graded ground directly from a vehicle doing the grading, comprising a base, means for mounting said base directly on the vehicle in a readily viewable position by an operator of the vehicle, an indicator arm pivotally mounted on said base and manually adjustable by the operator during the grading operation to different positions corresponding to desired slopes being graded by the vehicle, indicia means on said base corresponding to the desired slopes of the ground, means for retaining said indicator arm in an adjusted position corresponding to a selected slope indicia, said retaining means including a guide plate and a frictional mating surface on said arm, the pivot point for said arm being formed by an adjustable fastener at the fixed end of said arm, and said guide plate being located adjacent the movable end of said arm, said guide plate including a curved spring strip fixed on said base, the central portion of said strip along the range of indicia being raised into biased frictional engagement with said arm, and level means on said arm to indicate when said vehicle is positioned on the graded ground at the selected slope.

2. The slope analyzing device of claim 1, wherein said indicia are marked to denote numerical horizontal to vertical ratios for direct slope readings.

3. The slope analyzing device of claim 2, wherein said indicia means extends up and down from the no-slope position of said arm, whereby right and left slopes may be analyzed.

4. The slope analyzing device of claim 1, wherein said level means comprises a visual spirit level tube mounted in a window of said arm.

5. The slope analyzing device of claim 1, wherein said spring strip is a contrasting color and is positioned behind said level tube to provide better visibility through said window.

* * * * *